US007869952B1

(12) United States Patent
Budzien

(10) Patent No.: US 7,869,952 B1
(45) Date of Patent: Jan. 11, 2011

(54) INTERLACED LIMB SCANNING METHOD

(76) Inventor: Scott Alan Budzien, 6114 Tammy Dr., Alexandria, VA (US) 22310

( * ) Notice: Subject to any disclaimer, the term of this patent is extended or adjusted under 35 U.S.C. 154(b) by 191 days.

(21) Appl. No.: 12/129,786

(22) Filed: May 30, 2008

Related U.S. Application Data

(60) Provisional application No. 60/941,035, filed on May 31, 2007.

(51) Int. Cl.
*G01W 1/16* (2006.01)
(52) U.S. Cl. .......................................................... 702/3
(58) Field of Classification Search ................ 702/2–4, 702/22, 94, 104, 137, 143, 144, 150, 151
See application file for complete search history.

(56) References Cited

U.S. PATENT DOCUMENTS

| 5,960,097 A * | 9/1999 | Pfeiffer et al. .............. 382/103 |
| 2005/0038602 A1 * | 2/2005 | Uchida ........................... 702/2 |

* cited by examiner

*Primary Examiner*—Mohamed Charioui

(57) ABSTRACT

A method for remote atmospheric sensing. A sensor is provided on a moving platform above earth, the sensor including a plurality of fields of regard along the orbit, each field of regard of the plurality of fields of regard comprising a respective first subscan and a respective second subscan. The sensor is slewed to, and sampling an atmospheric region at, a respective first plurality of lines-of-sight to generate the respective first subscan and slewing the sensor to, and sampling the atmospheric region at, a respective second plurality of lines-of-sight to generate the respective, second subscan, the respective first subscan comprising a plurality of first subscan samples at the respective first plurality of lines-of-sight of the atmospheric region, the respective second subscan comprising a plurality of second subscan samples at the respective second plurality of lines-of-sight of the atmospheric region. An interlaced limb scan is generated for the each field of regard by interleaving at least one of the first subscan samples between at least two of the second subscan samples. Two-dimensional tomographic retrieval is applied to the interlaced limb scan to determine at least one of density, temperature, and chemical composition data of the atmospheric region.

7 Claims, 7 Drawing Sheets

INTERLACED LIMB SCANNING METHOD

CROSS-REFERENCE TO RELATED APPLICATIONS

This application claims the benefit of priority under 35 U.S.C. §119(e) to provisional U.S. Patent Application Ser. No. 60/941,035, entitled "INTERLACED LIMB SCANNING," to Scott Budzien.

TECHNICAL FIELD

The present invention relates generally to a method of remote atmospheric sensing, and more particularly to a method of remote atmospheric sensing using limb scanning.

BACKGROUND ART

Remote sensing involves gathering data and information about a physical system by measuring radiation, particles, and fields associated with components of the system using sensors located some distance away. One common application of remote sensing is weather forecasting performed using data from weather satellites and Doppler radar. These and other remote sensing approaches can be used to address a variety of problems in which a measuring device cannot be located within the object being studied, including medical imaging, planetary and solar physics, nuclear fusion diagnostics, and microscopy.

With respect to atmospheric remote sensing, in addition to radar and weather imaging, a number of less-familiar instruments and methods are also employed, including limb scanning. Before discussing limb scanning, three terms will be defined: "field-of-view" refers to the angular area (usually height and width) that is instantaneously sampled by a remote sensing device; "field-of-regard" refers to the total angular area observable by a sensor, which can be larger than the field-of-view for those sensors with steerable pointing capability; and "line-of-sight" refers to an unobstructed view from the sensor to the target of interest, typically centered in the field-of-view and extending toward infinity, along which signal is gathered from the target during a sample period.

FIG. 1 is a schematic showing remote sensing lines-of-sight 40, 42 from a limb scanner or sensor on a satellite 30, 32 at different locations moving in low Earth orbit. Reference numerals 30, 32 refer to different locations in space of the same satellite. The "limb" refers to the outer edge of the apparent disk of a planetary, stellar, or celestial body 20; the limb is merely the horizon, albeit a curved horizon on account of the distance or altitude of the viewer. Reference numerals 10, 12 refer to two limbs corresponding to the different locations of the sensor. Limb scanning is one technique for remotely sensing an atmosphere by measuring the photon intensity near the horizon as an instrument's field-of-view is angularly scanned in the radial (or vertical to the surface of the planetary, stellar, or celestial body 20) direction. Typically, limb scanning is performed from low-Earth-orbit satellites, but limb scanning can be performed using any sensor mounted on either a moving (e.g., satellite, plane, or balloon) or fixed (e.g., mountaintop) platform.

Limb scanners may employ a moving objective mirror or may slew the entire sensor on a gimballed platform to scan the instrument field-of-view across the atmospheric limb. Optimal limb scanning requires balancing the number of vertical samples per scan, the horizontal distance between scans, the integration time per sample, the physical spatial scales of the system being measured, the motion of the sensor platform, and the size and sensitivity of the instrument. Moreover, for any given instrument and physical system being measured, trade-offs can be made between vertical sampling and horizontal sampling characteristics.

Almost all limb scan data analyses performed to date use a very simplistic approach to retrieve atmospheric characteristics from the data. This approach relies upon the assumption that the atmospheric is horizontally stratified or, equivalently, that the atmospheric is spherically symmetrical. With the simplifying assumption of spherical symmetry and a stratified atmosphere, each limb scan can be inverted to characterize the atmospheric layers near the geographical locus of geometrical tangent points for the lines-of-sight. The atmospheric composition, temperature, etc. are assumed to vary in the vertical dimension only; hence, the term "1-D" retrievals.

A whole series of limb scans may be acquired as a satellite orbits the globe. Since atmospheres are known to exhibit latitude, longitude, and time-of-day variations, the assumption of spherical symmetry is flawed. Consequently, atmospheric retrievals from 1-D algorithms include a variety of artifacts and errors. The severity of these errors depends upon how much the atmosphere departs from spherical symmetry about the tangent location, i.e., upon the magnitude of gradients along the lines-of-sight. For highly structured atmospheric features, such as the nightside ionosphere, 1-D retrieval can be highly inaccurate.

Since the whole purpose of satellite remote sensing is to characterize the global variations of the atmosphere, the primary assumption of spherical symmetry is violated at the outset. Researchers have developed more sophisticated approaches to remote sensing that relax this simplistic assumption. In these approaches, an entire sequence of limb scans along a portion of an orbit may be inverted simultaneously. The atmospheric structure is assumed to vary both in altitude and along the orbit path; so, these are referred to as 2-D retrievals. This 2-D approach is called tomography, from the Greek word for "cut", since a slice of the atmosphere is analyzed. This approach is wholly analogous to X-ray computer-assisted tomography used in medical imaging.

Applicant recognized that while tomographic analyses have addressed the problem of reducing artifacts and errors remote in sensing data, they are still limited by the data collection techniques used in the sensors themselves. Basically, the current generation of space sensors was not designed for 2-D tomographic operations: they have sensitivity limitations and data sampling limitations that are not optimal for tomographic analysis. The biggest problem for standard limb-scan techniques is that the horizontal in-track resolution is limited by the cadence of limb scans. The cadence of limb scans, in turn, is determined by the number of vertical samples and the dwell-time at each sample bin, which are driven by vertical resolution and signal-to-noise requirements.

Conventional limb scanning entails sweeping the field-of-view of a sensor in a single direction (i.e., either low- to high-altitudes or high- to low-altitudes) within a larger field-of-regard, such as shown in FIG. 2. FIG. 2 shows conventional limb scanning from orbit, which sweeps the field-of-view consecutively through a range of angles, the field of regard, as the sensor moves. This is usually accomplished with a smoothly-moving scan mirror or by gimballing the entire instrument. For tomographic applications, the scanning should be performed roughly within the plane of the sensor's motion. Measurements are sampled while the field-of-view is moving, so the maximum sampling time is limited by the desired spatial resolution and maximum acceptable blurring. The minimum sampling time is determined by signal-tonoise limitations. The field-of-regard is determined by the physics of the problem being studied, as it corresponds to the total altitude range measured by the sensor.

Much of the information for each sample location originates near the geometrical tangent point of each line-of-sight, on account of the exponential altitude dependence of atmospheric density; the tangent point occurs at the lowest altitude with the greatest atmospheric density, such as shown in FIG. 3. FIG. 3 shows three consecutive limb scans plotted in cylindrical coordinates (i.e., ground distance and altitude). In these transformed coordinates the round earth is seen as a flat line, and the lines-of-sight are curved. During each limb scan, the tangent point locations stack-up into nearly vertical/radial columns that are spaced apart equally according to the limb scan cadence such as shown in FIG. 4. FIG. 4 shows the tangent locations for the three consecutive limb scans shown in FIG. 3. The sampled regions comprise nearly vertical columns that are spaced according to the limb scan cadence. The intrinsic horizontal/in-track spacing of these vertical columns limits the attainable horizontal resolution in degrees of a limb scan sequence to $$R_{HORIZONTAL} = P_{SCAN}/P_{ORBIT} * 360$$

where $P_{ORBIT}$ and $P_{SCAN}$ are the orbital and limb scan periods.

Moreover, the vertical dimension is frequently somewhat oversampled, because most limb scanners sample data at a constant rate throughout the full altitude range, irrespective of the actual physical scale heights characteristic of various layers of the atmosphere. Vertical oversampling and in-track undersampling is poorly-suited for atmospheric tomography.

DISCLOSURE OF THE INVENTION

Applicant recognized that nothing can be done to change the sensitivity limitations built into the sensor hardware for currently operating instruments that determine the minimum sample time, and the altitude range and vertical resolution are set by the physics of the phenomena under study. However, in many cases, it is possible to implement flight software modifications that overcome the limitations of standard limb-scanning to tremendously improve the measurements for the purpose of atmospheric tomography. An embodiment of the limb scan invention described below results in increased horizontal resolution, yet retains all of the vertical sampling points over each limb scan region, significantly improving the fidelity of tomographic retrievals.

In an embodiment of the invention, interlaced limb scanning is a non-sequential sampling technique for atmospheric remote sensing from a moving platform. The interlaced sampling pattern improves the spatial resolution in the direction of motion yet maintains high spatial resolution in the planes perpendicular to motion. The improved uniformity of this non-sequential sampling distribution can increase the accuracy and spatial resolution of 2-D and 3-D tomographic retrievals of atmospheric regions.

An embodiment of the invention includes a method for remote atmospheric sensing. A sensor is provided on a moving platform above earth, the sensor including a plurality of fields of regard along the orbit, each field of regard of the plurality of fields of regard comprising a respective first subscan and a respective second subscan. The sensor is slewed to, and sampling an atmospheric region at, a respective first plurality of lines-of-sight to generate the respective first subscan and stewing the sensor to, and sampling the atmospheric region at, a respective second plurality of lines-of-sight to generate the respective second subscan, the respective first subscan comprising a plurality of first subscan samples at the respective first plurality of lines-of-sight of the atmospheric region, the respective second subscan comprising a plurality of second subscan samples at the respective second plurality of lines-of-sight of the atmospheric region. An interlaced limb scan is generated for the each field of regard by interleaving at least one of the first subscan samples between at least two of the second subscan samples. Two-dimensional tomographic retrieval is applied to the interlaced limb scan to determine at least one of density, temperature, and chemical composition data of the atmospheric region.

Optionally, each field of regard of the plurality of fields of regard includes a corresponding plurality of M subscans, where M is greater than two. Each corresponding plurality of M subscans includes the respective first subscan and the respective second subscan. Optionally, the slewing the sensor to, and sampling an atmospheric region at, a respective first plurality of lines-of-sight to generate the respective first subscan and slewing the sensor to, and sampling the atmospheric region at, a respective second plurality of lines-of-sight to generate the respective second subscan includes alternating the respective first plurality of lines-of-sight and the respective second plurality of lines-of-sight by N, where N is at least one.

Optionally, a first number of the first subscan samples is greater than a second number of the second scan samples.

Optionally, the generating a limb scan comprises sampling by the sensor in one of increasing and decreasing order along the respective first plurality of lines-of-sight for the respective first subscan and one of increasing and decreasing order along the respective second plurality of lines-of-sight for the respective second subscan.

Optionally, the respective first subscan overlaps the respective second subscan.

Optionally, the moving platform comprises one of an aircraft, a satellite, and a balloon.

BEST MODES OF CARRYING OUT THE INVENTION

Figure 4:
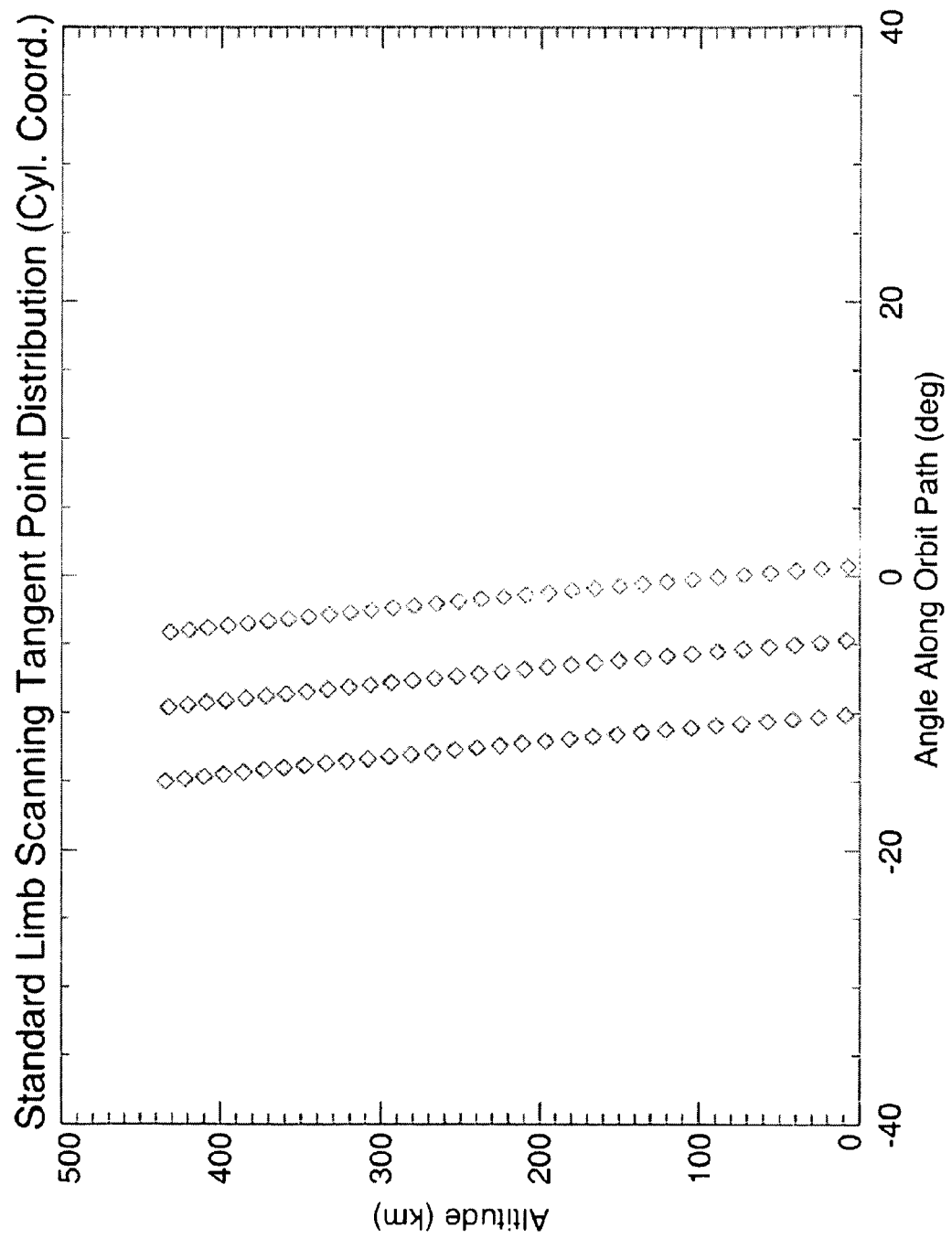
FIG. 4 is an illustrative graph of the distribution of tangent point locations for the three consecutive limb scans shown in FIG. 3

One simple way of encoding a dataset is sequentially, datum by datum in order. As can be seen above in the case of simple limb scanning, sequential sampling is not optimal for all analysis methods. Applicant recognized that the sequential sampling of the atmospheric limb directly led to those nearly-vertical sample location columns and their characteristic wide, regular spacing, such as shown in FIG. 4. Consequently, the limited horizontal resolution and poor suitability for tomography of current limb scanner datasets originates in their data sampling pattern—not in the limb-scanning measurement technique per se.

Applicant recognized that, as an alternative to sequential sampling, data can be sampled and reproduced using an alternating pattern of interspersed elements, called "interlacing." Probably, the most familiar implementation of interlacing is television video, in which even and odd-numbered television lines are drawn in alternate image frames. Video interlacing is primarily used as a data compression method: only' of an image is transmitted and drawn during each frame. There is a significant resolution loss and motion artifacts can be introduced, but these problems in the moving images are largely imperceptible to the human eye, which has a relatively slow response time.

Interlacing techniques can be introduced into the field of remote space sensing and atmospheric measurement. However, interlacing for limb scanning is not approached from the same perspective as for television video. Video interlacing is a straightforward data compression technique: vertical resolution is reduced to achieve lower data bandwidth, while the time resolution remains constant. In remote sensing, bandwidth is generally fixed by hardware. However, high-quality tomography requires adequate horizontal in-track resolution; Applicant determined that this can be achieved by sacrificing some vertical resolution. Limb scanning according to the instant invention utilizes the sample redistribution feature of interlacing, rather than its data compression capability.

An embodiment of the invention includes a method for remote atmospheric sensing. A sensor is provided on a moving platform above earth, the sensor including a plurality of fields of regard along the orbit, each field of regard of the plurality of fields of regard comprising a respective first subscan and a respective second subscan. The sensor is slewed to, and sampling an atmospheric region at, a respective first plurality of lines-of-sight to generate the respective first subscan and slewing the sensor to, and sampling the atmospheric region at, a respective second plurality of lines-of-sight to generate the respective second subscan, the respective first subscan comprising a plurality of first subscan samples at the respective first plurality of lines-of-sight of the atmospheric region, the respective second subscan comprising a plurality of second subscan samples at the respective second plurality of lines-of-sight of the atmospheric region. An interlaced limb scan is generated for the each field of regard by interleaving at least one of the first subscan samples between at least two of the second subscan samples. Two-dimensional tomographic retrieval is applied to the interlaced limb scan to determine at least one of density, temperature, and chemical composition data of the atmospheric region.

Limb scanning is generally performed using a motorized system to move the field-of-view vertically within the field-of-regard. This system might employ a motorized mirror to direct the field-of-view in a fixed instrument or might use a motorized mount to move the entire instrument to aim the field-of-view. Alternatively, in the case of imaging instruments with 2-D format detectors, portions of the image could be electronically read-out successively over time producing a virtual limb scan.

Several algorithms exist which are capable of inverting limb scan data to produce tomographic atmospheric measurements. One that has been used for remote sensing limb scan data is described in F Kamalabadi, G Bust, K F Dymond, S Gonzalez, P Bernhardt, S Chakrabarti, D Cotton, A Stephan, R McCoy, S Budzien, and S Thonnard (2002), "Tomographic Studies of Aeronomic Phenomena Using Radio and UV Techniques", *Journal of Atmospheric and Solar-Terrestrial Physics (JASTP)*, 64, 1573.

Optionally, the each field of regard of the plurality of fields of regard includes a corresponding plurality of M subscans, where M is greater than two. Each corresponding plurality of M subscans includes the respective first subscan and the respective second subscan. Optionally, the stewing the sensor to, and sampling an atmospheric region at, a respective first plurality of lines-of-sight to generate the respective first subscan and stewing the sensor to, and sampling the atmospheric region at, a respective second plurality of lines-of-sight to generate the respective second subscan includes alternating the respective first plurality of lines-of-sight and the respective second plurality of lines-of-sight by N, where N is at least one.

Optionally, a first number of the first subscan samples is greater than a second number of the second scan samples.

Optionally, the generating a limb scan comprises sampling by the sensor in one of increasing and decreasing order along the respective first plurality of lines-of-sight for the respective first subscan and one of increasing and decreasing order along the respective second plurality of lines-of-sight for the respective second subscan.

Optionally, the respective first subscan overlaps the respective second subscan.

Optionally, the moving platform comprises one of an aircraft, a satellite, and a balloon.

Consider the following simple example of a six-point limb scan for a polar-orbiting satellite at 840 km, as shown in Table 1. The left column shows the sample time, viewing angles, tangent point latitudes, and tangent point altitudes of a simple, sequentially-sampled limb scan; on the right, the corresponding values are shown for a dual-interlaced limb scan. (This six-point scan is overly-simplistic, but adequately illustrates the sampling.)

TABLE 1

Comparison of Simple vs. Interlaced Limb Scan Sampling

| Simple Limb Scan | | | | Interlaced Limb Scan | | | |
|---|---|---|---|---|---|---|---|
| Sample Time (sec) | Viewing Angle (deg) | Tangent Latitude (deg) | Tangent Altitude (km) | Sample Time (sec) | Viewing Angle (deg) | Tangent Latitude (deg) | Tangent Altitude (km) |
| 1 | 100 | 80 | 730 | 1 | 100 | 80 | 730 |
| 11 | 102 | 77 | 682 | 11 | 104 | 75 | 626 |
| 21 | 104 | 75 | 626 | 21 | 108 | 71 | 487 |
| 31 | 106 | 72 | 560 | 31 | 102 | 76 | 682 |
| 41 | 108 | 70 | 487 | 41 | 106 | 72 | 560 |
| 51 | 110 | 67 | 405 | 51 | 110 | 67 | 405 |

Illustrative properties of interlaced limb scanning according to an embodiment of the instant invention (as indicated by Table 1) include one or more of the following.

1. A "complete scan" covers the full set of viewing angles, also called lines-of-sight, that are sampled in the simple, sequential limb scan.
2. A complete scan contains two or more subsets of viewing angles, called subscans, such that each of the viewing angles in the complete scan is contained in one or more subscans. (In true interlacing, each scan angle would be contained in exactly one subscan; in interlacing with oversampling, some scan angles could occur in more than one subscan.)
3. Samples may be acquired at sequentially increasing (or decreasing) viewing angles within each subscan. (Typically, the scan direction will be the same for all subscans to yield the most uniform distribution of tangent point locations.)
4. The order in which the samples for the complete scan are taken is therefore changed from simple sequential order. One can devise simple interlacing schemes of order N where every Nth point is sampled:

| | |
|---|---|
| Order 2 | Subscan1: 1, 3, 5, 7, . . . |
| | Subscan2: 2, 4, 6, 8, . . . |
| Order 3 | Subscanl: 1, 4, 7, 10, . . . |
| | Subscan2: 2, 5, 8, 11, . . . |
| | Subscan3: 3, 6, 9, 12, . . . | etc.

One could also devise more complex sampling approaches in which portions of the sampled region are covered N times and other portions covered by more or fewer subscans. As an example, if a portion of the sampling region exhibits greater horizontal structure, it could be sampled in three subscans while other regions were sampled in two:

Order 2/3 Subscan1: 1,3,5,7,9,12,15,18,20,22
Subscan2: 10,13,16
Subscan3: 2,4,6,8,11,14,17,19,21,23

5. Each interlaced limb scan covers the same viewing angles and tangent altitudes as a simple limb scan over a complete scan period.
6. The interlaced limb scanning covers approximately the same horizontal/in-track locations as simple limb scanning during the scan period. However, the horizontal samples are swept out in two or more overlapping subscans, rather than a single sweep. This interspersing of horizontal samples is what improves the horizontal resolution of the measurement set.
7. Achieving interlaced limb scanning requires that a sensor's limb scanning hardware is capable of quickly stewing to a viewing angle position and then slowing or stopping to make the measurement; this must be performed repeatedly until all the viewing angles for the full limb scan have been measured.

Figure 1:
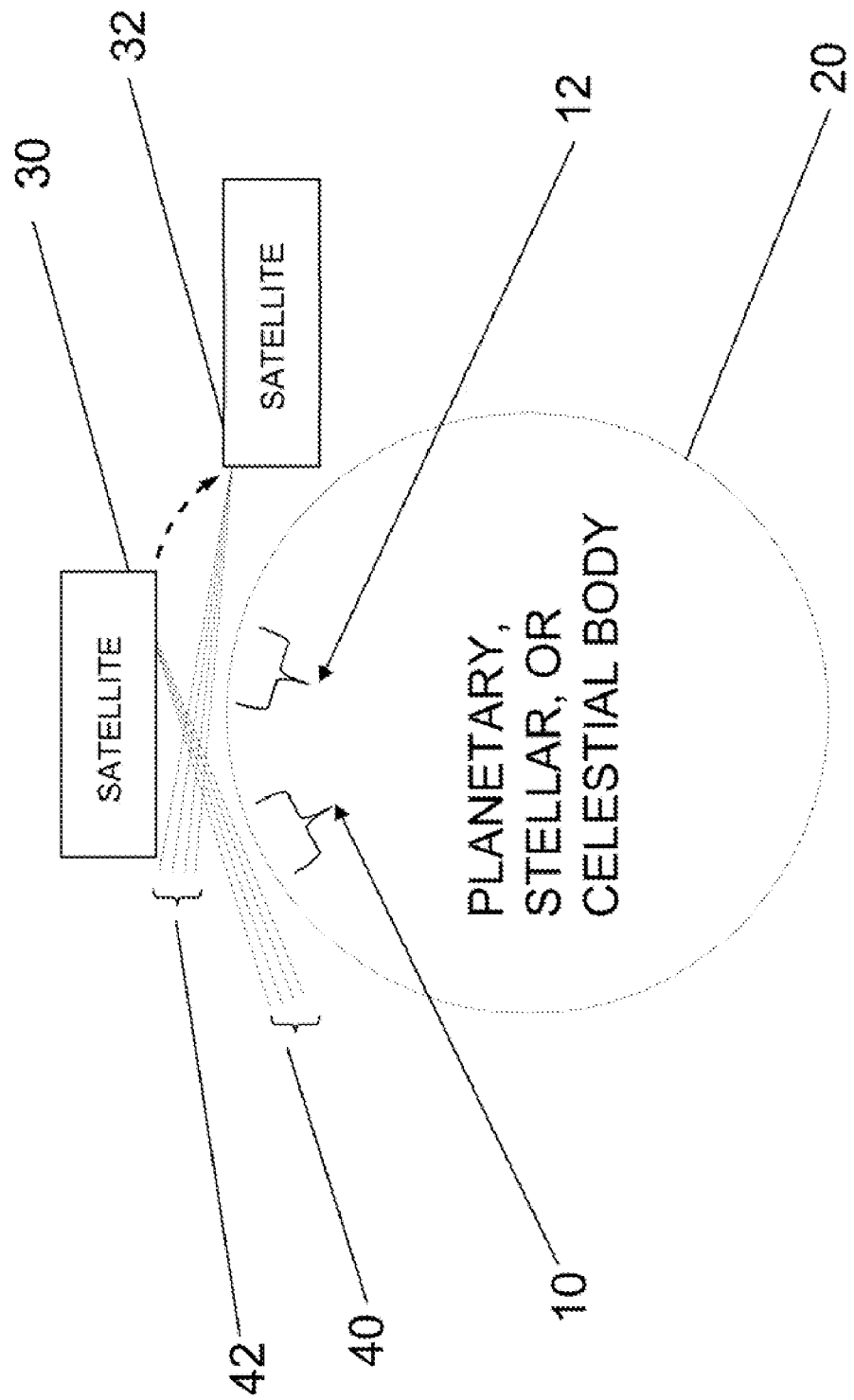
FIG. 1 is a schematic showing a sensor configuration for standard limb scanning.
Figure 2:
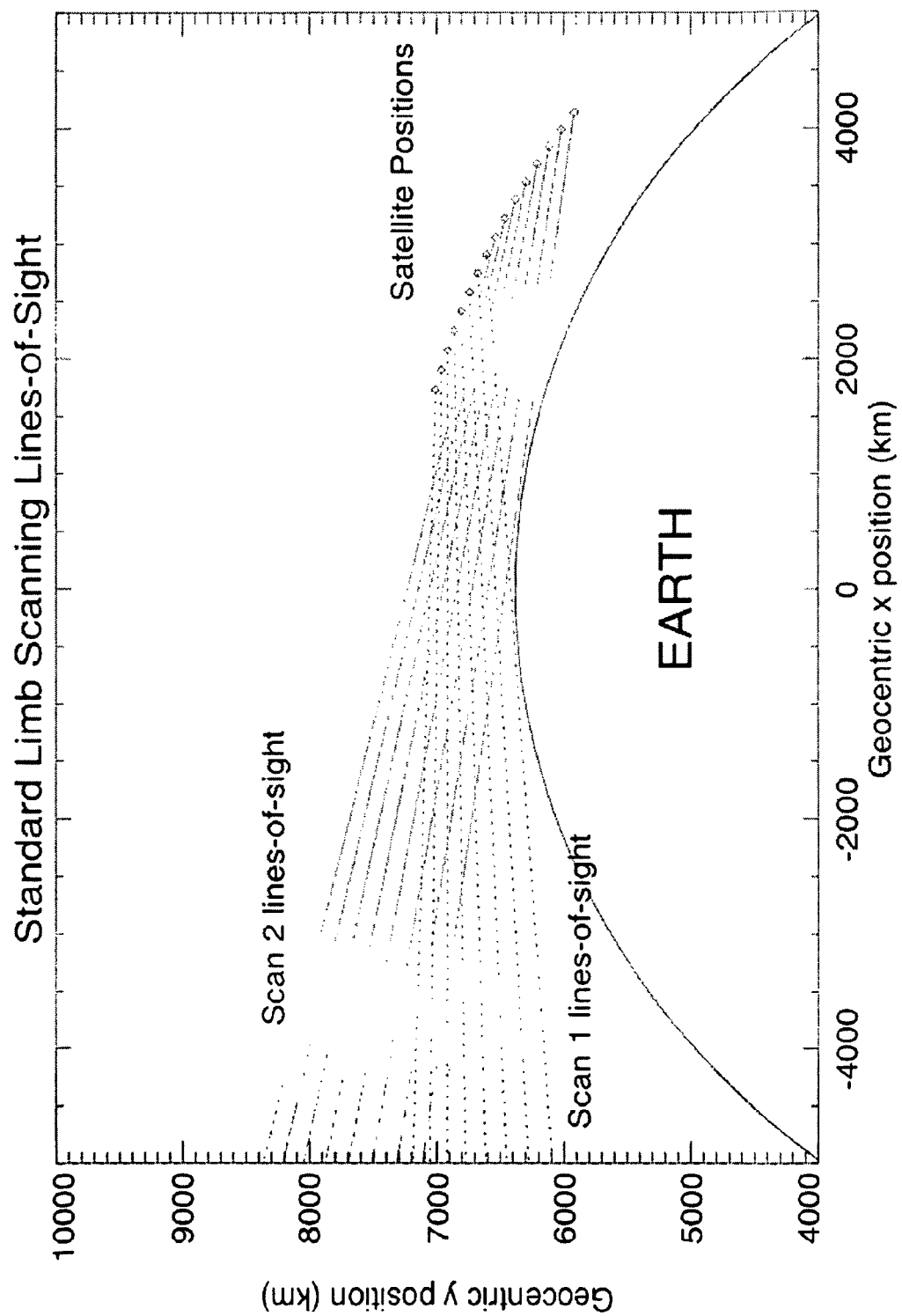
FIG. 2 is an illustrative graph depicting a time-sequence of lines-of-sight swept through a range of angles within a field-of-regard during two standard limb scans from a satellite.
Figure 3:
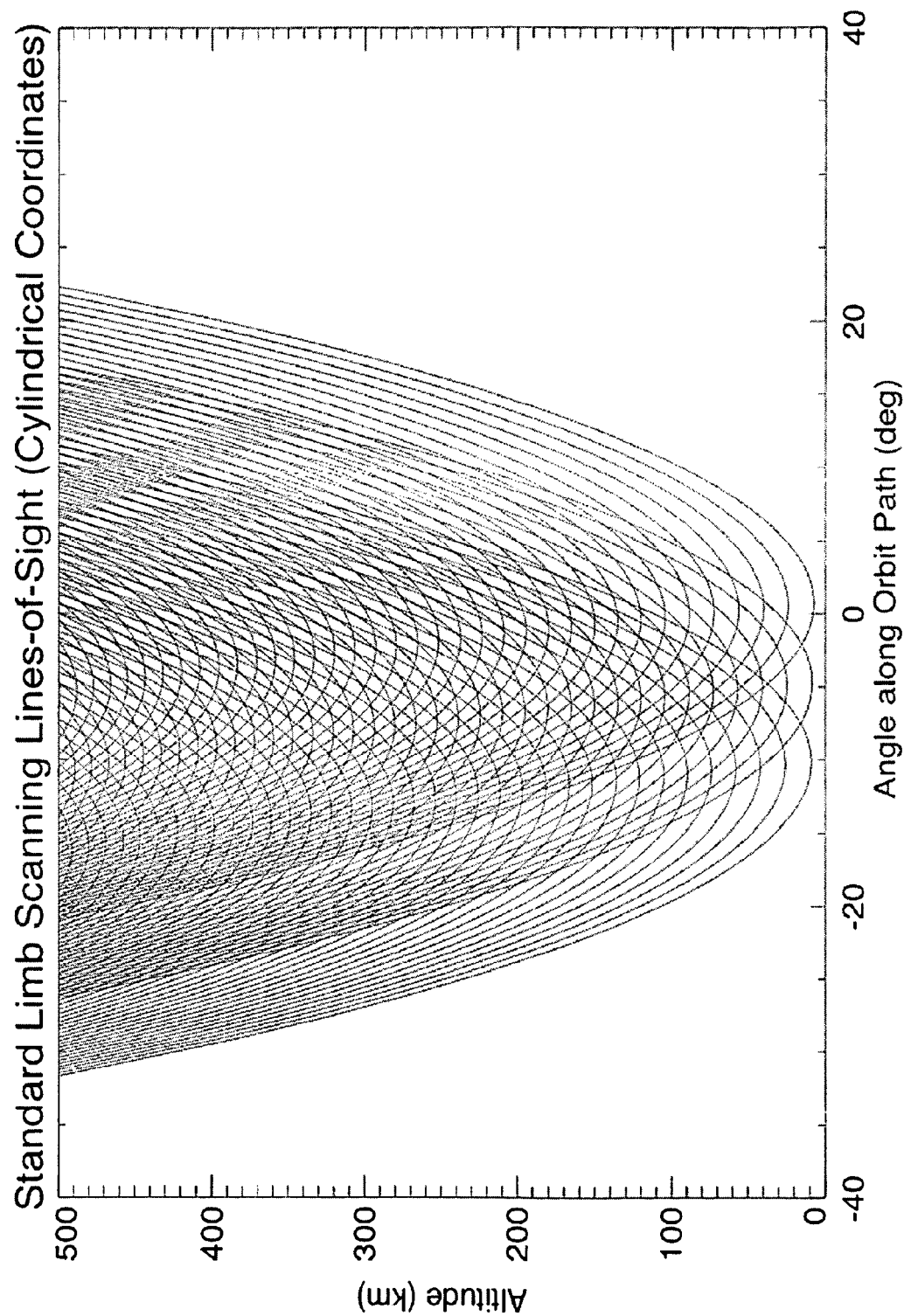
FIG. 3 is an illustrative graph of three consecutive limb scans plotted in cylindrical coordinates (in which the round Earth surface appears flat and lines-of-sight appear curved). The vertical axis is altitude above the Earth surface and the horizontal axis is angle along the orbital track (e.g. latitude).
Figure 5:
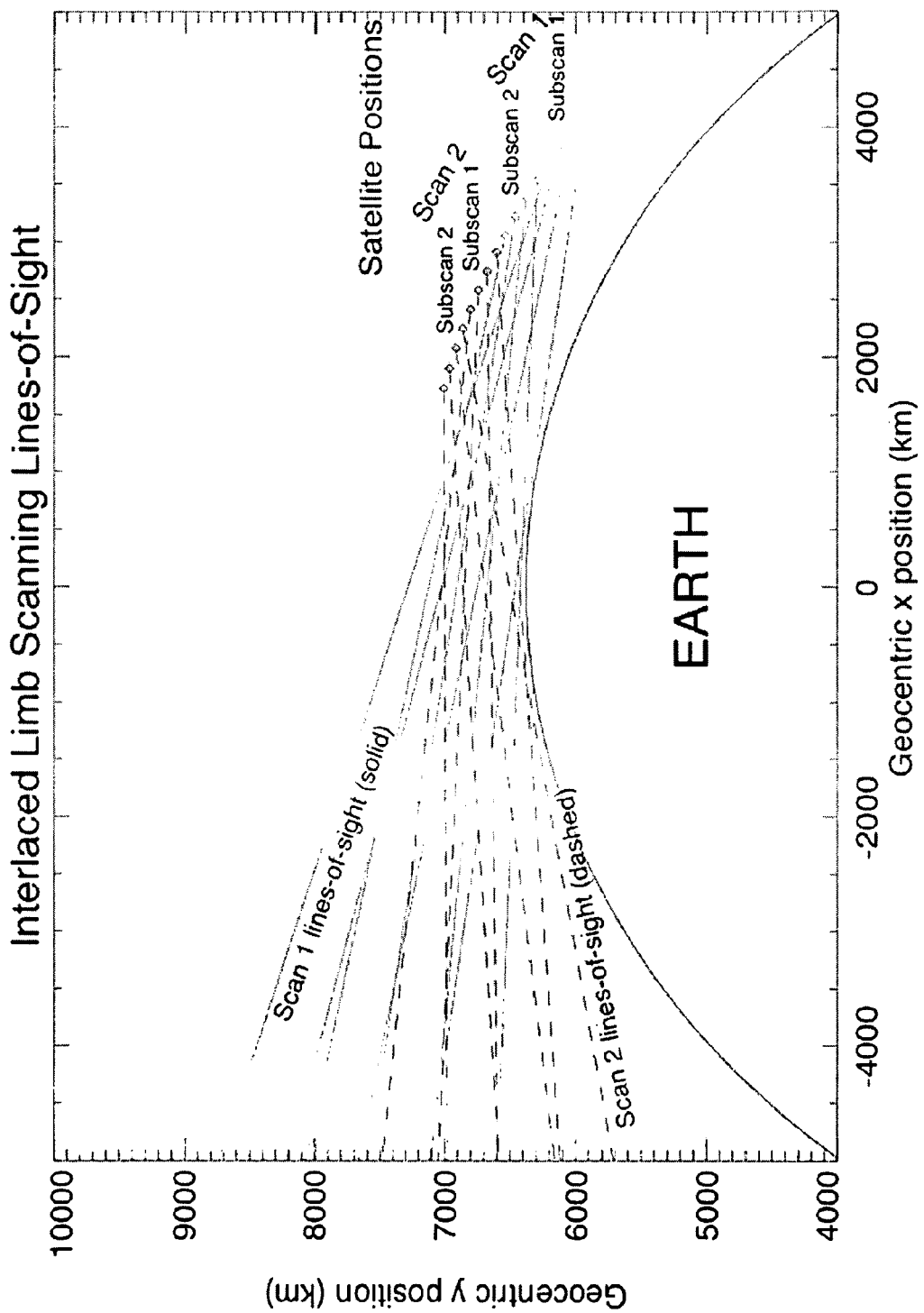
FIG. 5 is an illustrative graph using an embodiment of the interlaced limb scanning method. A time-sequence of lines-of-sight are depicted as they swept through a range of angles within a field-of-regard during two interlaced limb scans from a satellite.
Figure 6:
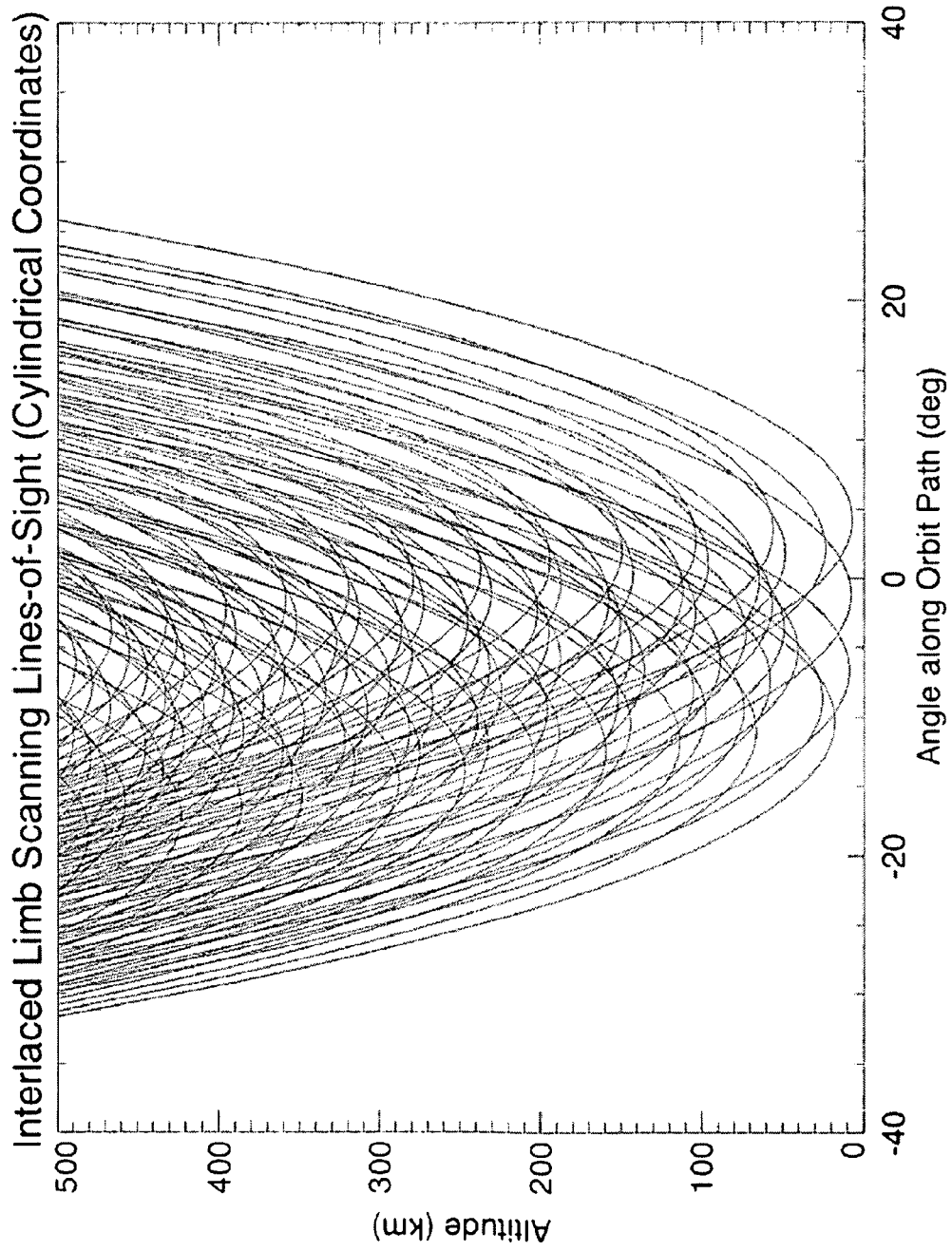
FIG. 6 is an illustrative graph of three consecutive interlaced limb scans according to an embodiment of the instant limb scanning plotted in cylindrical coordinates. The vertical axis is altitude above the Earth surface and the horizontal axis is angle along the orbital track (e.g. latitude).
Figure 7:
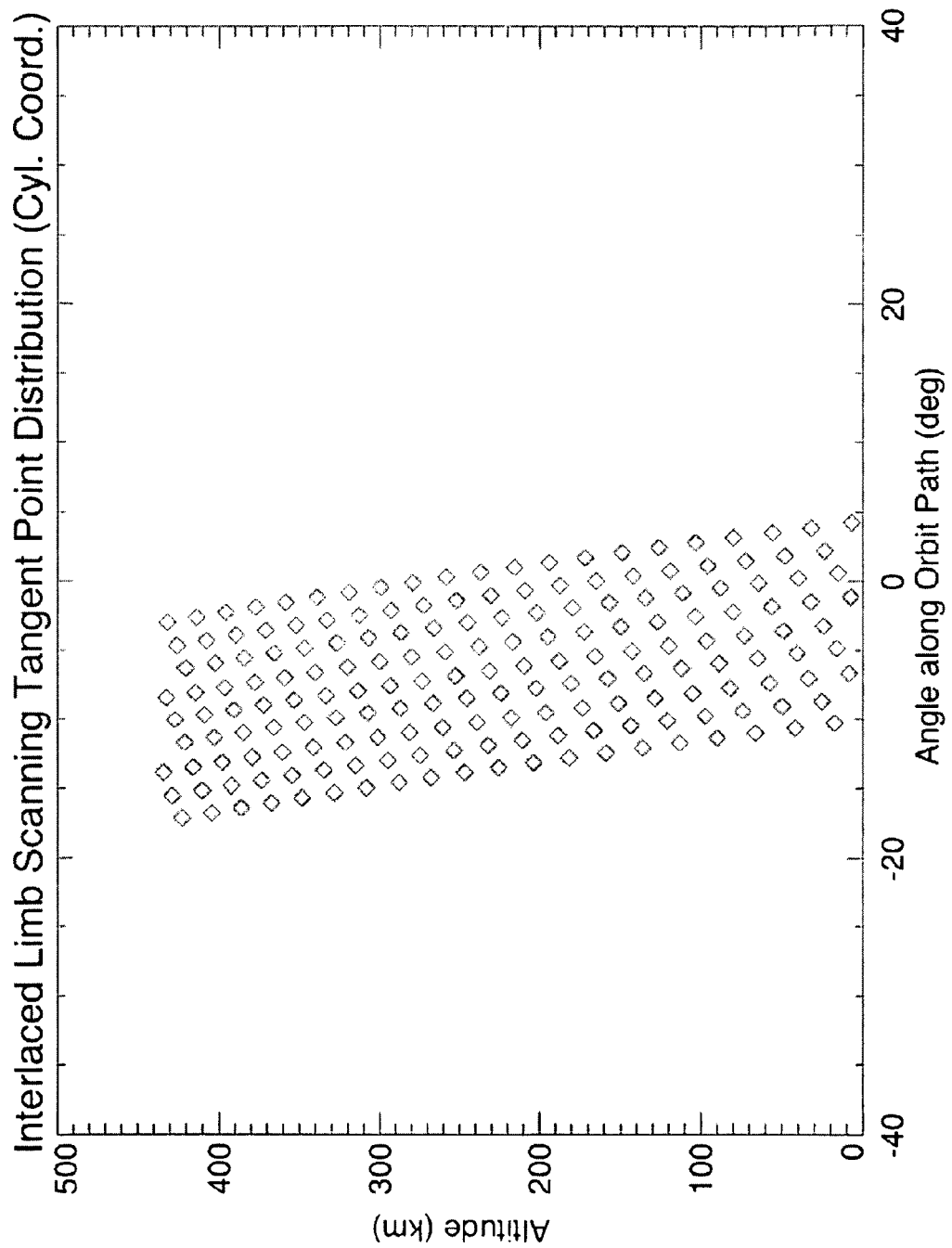
FIG. 7 is an illustrative graph of the tangent locations for three consecutive Order-3 interlaced limb scans according to an embodiment of the instant limb scanning method plotted in cylindrical coordinates.

By way of non-limiting example, to graphically illustrate a benefit of interlaced limb scanning, consider three graphics of interlaced scanning, shown in FIGS. 5-7, that are roughly analogous to FIGS. 2-4 of the conventional limb scanning discussed above. The lines-of-sight for interlaced limb scanning crisscross the sampled atmospheric regions several times such as shown in FIG. 5. FIG. 5 shows interlaced limb scanning from orbit, which sweeps a field-of-view two or more times through each field-of-regard, as the platform on which the sensor resides moves; the interlaced limb scanning samples different subsets of angles during each subscan sweep. Regions crossed by more than one line-of-sight are oversampled, which provides the basis for high-fidelity tomographic retrievals. Even in this simple diagram, the degree of oversampling/crossing is greater for interlaced scanning than for simple limb scanning shown in FIG. 2; the uniformity of sampling using the interlaced technique is even more evident in transformed coordinates such as shown in FIGS. 6 and 7. FIG. 7 shows the tangent locations for three consecutive Order-3 interlaced limb scans shown in cylindrical coordinates. The sampled points are spread out much more uniformly, no longer appearing as columnar as was the case for sequential limb scanning. The columnar pattern of FIG. 4 is still present in FIG. 7, but with closer spacing (according to the order of interlacing) than was possible in the original simple limb scan. For an Order N interlacing, the spatial resolution has been improved by a factor of N.

Under the same idealized assumption adopted for simple, sequential limb scanning—that the atmosphere has no horizontal gradients smaller than the cadence of complete limb scans—the altitude resolution of the complete interlaced limb scan would be identical to that of the simple limb scan, irrespective of sample order, because all of the same viewing angles are sampled. In this idealized case, no horizontal resolution is gained by interlacing, because the horizontal location of the sample is irrelevant when measuring a horizontally-uniform layer. This assumption is implicit for simple sequential limb scan measurements.

However, under the more realistic assumption of horizontal gradients in the atmosphere, interlacing provides the increased horizontal resolution capable of measuring horizontal variations; on the other hand simple limb scanning is completely insensitive to those variations. Eliminating the unrealistic uniformity assumption allows one to balance horizontal and vertical resolution, in which a gain in horizontal sampling resolution comes at the expense of vertical sampling resolution in the interlaced limb scans.

In an embodiment of the invention, limb scanners oversample the vertical dimension relative to the actual physical scale lengths characteristic of atmospheric vertical gradients. When such oversampling occurs, the effective resolution derives from the retrieval algorithm and the atmospheric physics—not the sampling distribution. Consequently, the loss in vertical resolution incurred by interlacing typically has negligible impact upon the atmospheric reconstructions and retrievals performed using tomographic or other modeling techniques.

Currently-operating space sensors may not have been designed for tomography. However, in an embodiment of the invention, these sensors are optionally capable of interlaced limb scan operations by uploading appropriately modified sensor flight-code to the spacecraft. As an example of a flight-code modification that could be performed, consider the case of the Special Sensor Ultraviolet Limb Imager ("SSULI") on the Defense Meteorological Satellite Program satellites. The SSULI sensor performs limb scanning using a computer-controlled motorized objective mirror. The on-board flight software includes a table which contains a sequence of scan mirror positions and slew rates for the motor to execute a simple, sequentially-sampled limb scan. By replacing the existing scan mirror position table in flight computer memory with a larger table containing interlaced scan mirror position angles and slew rates between adjacent angular table entries, the existing SSULI sensor could perform interlaced limb scanning. This is achievable by modifying the flight-code software on the ground to be subsequently uploaded to the flight computer through telemetry. Thus, interlaced limb scanning does not use specialized scan hardware, only specialized sampling patterns, which are typically encoded in software as described in the example. An example of such specialized sampling patterns is the Order-N interlacing scheme described above.

In an embodiment of the invention, the electromagnetic radiation sensed by the sensor is in the ultraviolet, infrared, or visible wavelength range.

Obviously, many modifications and variations of the present invention are possible in light of the above teachings without departing from the true scope and spirit of the invention. It is therefore to be understood that the scope of the invention should be determined by referring to the following appended claims.

What is claimed is:

1. A method comprising:
   providing a sensor on a moving platform above earth, the sensor comprising a plurality of fields of regard along an orbit, each field of regard of the plurality of fields of regard comprising a respective first subscan and a respective second subscan;
   slewing the sensor to, and sampling an atmospheric region at, a respective first plurality of lines-of-sight to generate the respective first subscan and slowing the sensor to, and sampling the atmospheric region at, a respective second plurality of lines-of-sight to generate the respective second subscan, the respective first subscan comprising a plurality of first subscan samples at the respective first plurality of lines-of-sight of the atmospheric region, the respective second subscan comprising a plurality of second subscan samples at the respective second plurality of lines-of-sight of the atmospheric region;
   generating an interlaced limb scan for the each field of regard by interleaving at least one of the first subscan samples between at least two of the second subscan samples; and
   applying two-dimensional tomographic retrieval to the interlaced limb scan to determine at least one of density, temperature, and chemical composition data of the atmospheric region.

2. The method according to claim 1, wherein the each field of regard of the plurality of fields of regard comprises a corresponding plurality of M subscans, where M is greater than two, each corresponding plurality of M subscans comprises the respective first subscan and the respective second subscan.

3. The method according to claim 2, wherein said stewing the sensor to, and sampling an atmospheric region at, a respective first plurality of lines-of-sight to generate the respective first subscan and slewing the sensor to, and sampling the atmospheric region at, a respective second plurality of lines-of-sight to generate the respective second subscan comprises alternating the respective first plurality of lines-of-sight and the respective second plurality of lines-of-sight by N, where N is at least one.

4. The method according to claim 1, wherein a first number of the first subscan samples is greater than a second number of the second scan samples.

5. The method according to claim 1, wherein said generating a limb scan comprises sampling by the sensor in one of increasing and decreasing order along the respective first plurality of lines-of-sight for the respective first subscan and one of increasing and decreasing order along the respective second plurality of lines-of-sight for the respective second subscan.

6. The method according to claim 1, wherein the respective first subscan overlaps the respective second subscan.

7. The method according to claim 1, wherein the moving platform comprises one of an aircraft, a satellite, and a balloon.

* * * * *